United States Patent
Abercrombie et al.

(10) Patent No.: US 8,410,952 B2
(45) Date of Patent: Apr. 2, 2013

(54) METHODS FOR FOREWARNING OF CRITICAL CONDITION CHANGES IN MONITORING CIVIL STRUCTURES

(75) Inventors: Robert K. Abercrombie, Knoxville, TN (US); Lee M. Hively, Philadelphia, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 281 days.

(21) Appl. No.: 12/962,787

(22) Filed: Dec. 8, 2010

(65) Prior Publication Data

US 2012/0146802 A1      Jun. 14, 2012

(51) Int. Cl.
*G08B 21/00* (2006.01)
(52) U.S. Cl. .............. 340/669; 340/870.11; 340/870.21; 340/870.06; 340/539.1; 340/870.16; 73/234; 73/493; 73/649; 73/587; 73/579
(58) Field of Classification Search ................. 340/669, 340/870.11, 870.21, 870.06, 539, 870.161; 73/234, 493, 649, 587, 579, 586; 702/35, 702/182
See application file for complete search history.

(56) References Cited

U.S. PATENT DOCUMENTS

| | | | |
|---|---|---|---|
| 5,815,413 A | 9/1998 | Hively et al. | |
| 6,006,163 A | 12/1999 | Lichtenwalner et al. | |
| 6,012,337 A | 1/2000 | Hodge | |
| 6,292,108 B1 * | 9/2001 | Straser et al. | 340/870.11 |
| 6,459,050 B1 | 10/2002 | Muhs et al. | |
| 6,460,012 B1 | 10/2002 | Welch et al. | |
| 6,484,132 B1 | 11/2002 | Hively et al. | |
| 6,807,862 B2 * | 10/2004 | Duron et al. | 73/649 |
| 7,139,677 B2 | 11/2006 | Hively | |
| 7,204,145 B2 | 4/2007 | Heinks et al. | |
| 7,209,861 B2 | 4/2007 | Hively | |
| 7,228,240 B2 * | 6/2007 | Duron et al. | 702/34 |
| 7,401,495 B2 | 7/2008 | Heinks et al. | |
| 7,451,642 B2 | 11/2008 | Hara et al. | |
| 7,561,200 B2 | 7/2009 | Garvey, III et al. | |
| 2004/0078170 A1 | 4/2004 | Di Marzio | |
| 2005/0037730 A1 | 2/2005 | Montague | |
| 2005/0125197 A1 * | 6/2005 | Duron et al. | 702/182 |

(Continued)

FOREIGN PATENT DOCUMENTS

| | | |
|---|---|---|
| IN | 570KOL2007 A | 10/2008 |
| JP | 2006068300 A | 3/2006 |
| WO | 2010/034022 A1 | 3/2010 |

OTHER PUBLICATIONS

Datta, Anubhave, Fundamental Understanding, Prediction and Validation of Rotor Vibratory Loads in Steady-Level Flight, Digital Repository at the University of Maryland, Sep. 14, 2004.

(Continued)

*Primary Examiner* — Hoi Lau
(74) *Attorney, Agent, or Firm* — Boyle Fredrickson, S.C.

(57) ABSTRACT

Sensor modules (12) including accelerometers (20) are placed on a physical structure (10) and tri-axial accelerometer data is converted to mechanical power (P) data (41) which then processed to provide a forewarning (57) of a critical event concerning the physical structure (10). The forewarning is based on a number of occurrences of a composite measure of dissimilarity ($C_i$) exceeding a forewarning threshold over a defined sampling time; and a forewarning signal (58) is provided to a human observer through a visual, audible or tangible signal. A forewarning of a structural failure can also be provided based on a number of occurrences of ($C_i$) above a failure value threshold.

25 Claims, 4 Drawing Sheets

U.S. PATENT DOCUMENTS

| | | |
|---|---|---|
| 2006/0248954 A1 | 11/2006 | Snieder |
| 2008/0282817 A1 | 11/2008 | Breed |
| 2009/0210173 A1 | 8/2009 | Arms et al. |
| 2011/0137586 A1* | 6/2011 | Jiang et al. ............... 702/56 |
| 2012/0146802 A1* | 6/2012 | Abercrombie et al. ....... 340/669 |

OTHER PUBLICATIONS

Nagarajan, H. et al., Design, Fabrication and Testing of a Component HIC Tester for Aircraft Applications, International Journal of Crashworthiness, vol. 10, Issue 5, pp. 515-523, May 2005.

Lecomte, C., et al., A Shell Model for Tyre Belt Vibrations, Journal of Sound and Vibration, vol. 329, Issue 10, pp. 1717-1742, May 2010.

Purwar, Amit et al, A Wireless Sensor Network Compatible Triaxial Accelerometer: Application for Detection of Falls in the Elderly, Sensor Letters, vol. 6, No. 2, pp. 319-325, Apr. 2008.

Bouten C.V.C. et al., A Triaxail Accelerometer and Portable Data Processing Unit for the Assessment of Daily Physical Activity, IEEE transactions on Biomedical Engineering, vol. 44, pp. 136-147, 1997.

* cited by examiner

METHODS FOR FOREWARNING OF CRITICAL CONDITION CHANGES IN MONITORING CIVIL STRUCTURES

STATEMENT REGARDING FEDERALLY SPONSORED RESEARCH

This invention was made with assistance under Contract No. DE-AC05-00OR22725 with the U.S. Department of Energy. The Government has certain rights in this invention.

BACKGROUND OF THE INVENTION

The field of the invention is computer methods for monitoring and forewarning of condition changes, including critical events, such as structural failures in structures such as bridges, buildings, dams, tunnels and other civil structures. The technology can also be applied to large manufactured items such as airplanes, and mining and construction equipment.

Hively et al., U.S. Pat. No. 5,815,413, disclosed methods of forewarning in medical patients, and also described the applicability of nonlinear techniques to monitor machine conditions using accelerometer data. Hively et al., U.S. Pat. No. 6,484,132, provided improvements in these methods of forewarning. Hively, U.S. Pat. No. 7,139,677, introduced a composite measure of dissimilarity (C). This composite measure of condition change (C) was calculated from the sum of the four normalized measures of dissimilarity, including $U(\chi_C^2)$ and $U(L_C)$ from the connected phase space and including $U(\chi_N^2)$ and $U(L_N)$ from the non-connected phase space. This was developed further across multiple data channels in Hively, U.S. Pat. No. 7,209,861, where the composite measure of dissimilarity, (C), was used to provide an end-of-life forewarning factor (G).

Welch et al., U.S. Pat. No. 6,460,012, disclosed an apparatus for the detection of an indicator of imminent failure due to crack growth in structural elements. The apparatus included sensors for sensing physical data factors, a processor for computing a relationship between the physical data factors and an indicator of the failure event.

Hodge, U.S. Pat. No. 6,012,337 discloses physical integrity monitoring of bridges and buildings using optical sensors to sense directional movements of the structures in a plurality of axes.

Strasser et al., U.S. Pat. No. 6,292,108, discloses a data acquisition system for collecting data from a plurality of sensor units for sensing damage in civil structures resulting from earthquakes, for example. Strasser et al. discloses the use of accelerometers as sensors for collecting mechanical vibration data. Di Marzio, U.S. Pat. Pub. No. US2004/0078170 discloses a system with sensors disposed on a structure, a central repository and a mesh network for communicating the data from the sensors to the central repository.

The present invention improves over the prior art by providing an improved method of processing sensor data collected from sensors on a physical structure to provide a forewarning of a critical event signaling deterioration or failure of the structure.

SUMMARY OF THE INVENTION

The present invention provides a failure forewarning by acquiring accelerometer data, which is then converted into mechanical vibration power. The latter is to be distinguished from mechanical vibration data of the type utilized in the prior art.

Mechanical power data can be obtained by conversion of tri-axial acceleration data, a three-dimensional vector quantity, to mechanical power data, P, a scalar quantity by the dot product expression of two vectors, $P = A \cdot \int dt\, A$, where P is mechanical power, and A is an acceleration vector quantity. By using one or more sensors utilizing tri-axial accelerometers on the structure, and collecting sensor data, mechanical power (P) data can be obtained from processing the sensor data. Because this is a scalar quantity, this result is independent of the orientation of any tri-axial accelerometer providing the data. This data can be further processed to provide a forewarning of critical events including impending structural failures.

These failures can be due to various causes, such as low-temperature creep crack growth, stress corrosion cracking, and fatigue cracking in various materials (aluminum, steel, and glass-fiber/polymer matrix composite); single and multiple-site or widespread fatigue damage; and constant amplitude loading, as well as periodic overloads.

The method can be further implemented with various network configurations known in the art. The acceleration data can be transmitted through a local network and then through a wide area network to a host computer for further processing to compute and provide forewarning at a central location. Many other types of networks including wired and wireless Internet networks, cellular, satellite and cable networks and other networks to be developed in the future can also be utilized.

The method can also be practiced within a single sensor module attached to the civil structure, with forewarning signals transmitted to an appropriate location either nearby or through a network to a central monitoring location.

Other objects and advantages of the invention, besides those discussed above, will be apparent to those of ordinary skill in the art from the description of the preferred embodiments, which follows. In the description reference is made to the accompanying drawings, which form a part hereof, and which illustrate examples of the invention. Such examples, however, are not exhaustive of the various embodiments of the invention, and therefore reference is made to the claims, which follow the description for determining the scope of the invention.

DETAILED DESCRIPTION OF THE PREFERRED EMBODIMENTS

Figure 1:
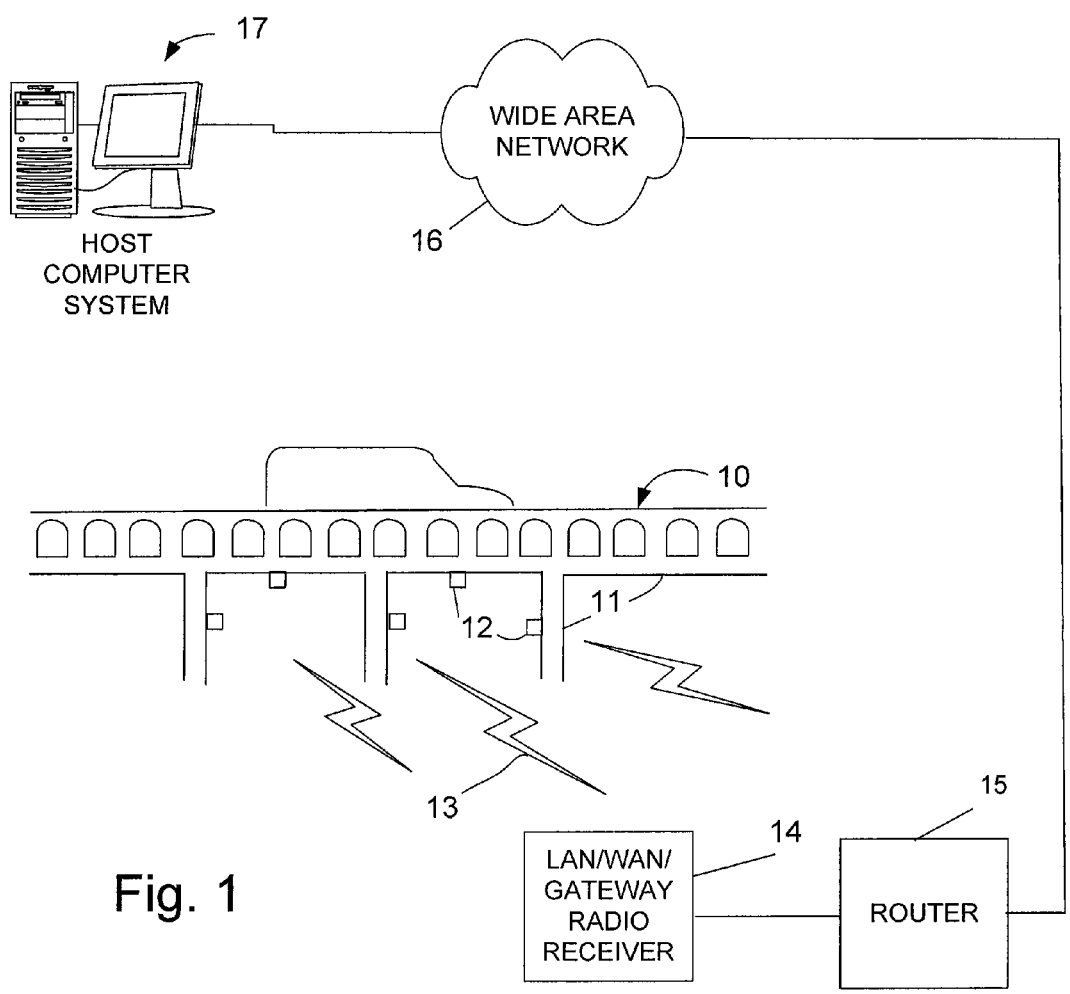
FIG. 1 is a schematic diagram of a network for collecting sensor data from a physical structure.

FIG. 1 illustrates a civil structure, in this example a bridge 10. Sensor modules 12 are mounted on the bridge members 11 by means for mounting 19 such as brackets, fasteners, adhesives, frames and panel enclosures, and others of a type known in the art. The sensors communicate by a local area network 13, preferably a wireless network, but a wired network is also possible, to a gateway radio receiver 14, which may also transmit signals to the sensor modules 12 in a two-way network. The range of transmission is limited by standards governing the particular type of local area wireless network and is preferably 100 meters or less, but may extend up to 400 meters or more in some other embodiments. The gateway 14 is connected to a router 15 for accessing a wide area network 16, such as the Internet. This allows for communications of data to a host computer system 17 at a central location with personnel for monitoring conditions at one or more civil structures 10.

Figure 2:
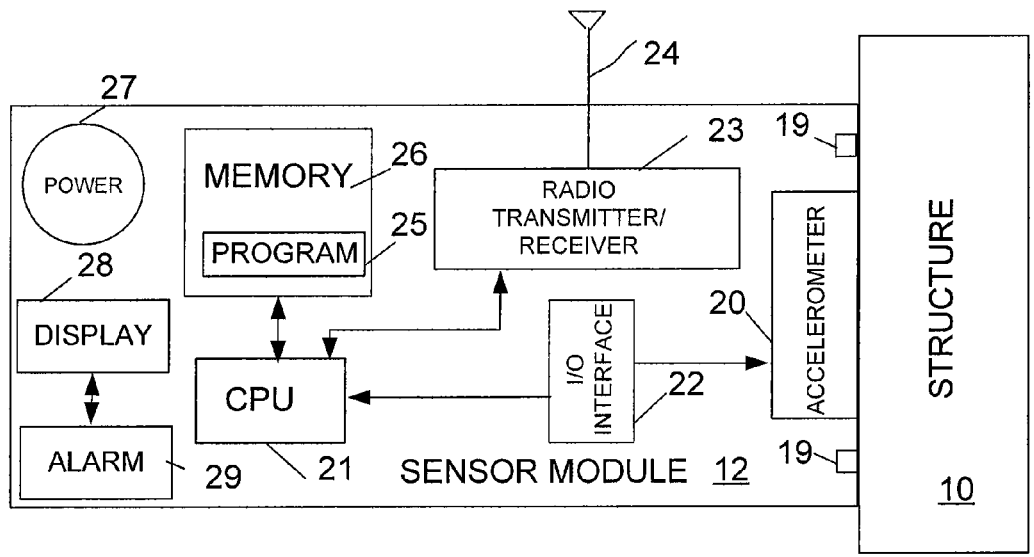
FIG. 2 is a block diagram of one of the sensors seen in FIG. 1.

Referring next to FIG. 2, one of the sensor modules 12 is illustrated. The sensor module 12 includes a multi-axis, typically a three-axis accelerometer 20, which is mounted to the civil structure 10 so as to sense motion along each of the axes and to generate axis acceleration data. Many types of accelerometers are known in the art, including those available from Analog Devices and others disclosed in U.S. Pat. No. 6,292, 108, cited above.

The sensor module 12 includes a microelectronic central processing unit (CPU) 21, also referred to more generally and more commonly as "a processor." The CPU 21 is interfaced to the accelerometer 20 through a suitable I/O interface 22 according to specifications of the CPU 21 and the accelerometer 20. The CPU 21 is also connected by suitable buses to a radio transmitter/receiver circuit 23 of a type known in the art for converting between digital data and radio signals encoded with the data. The radio transmitter/receiver circuit 23 transmits and receives these signals through a suitable antenna 24. The CPU 21 is operated by executing instructions in a control program 25 stored in memory 26. The memory 26 is shown generally and may include both memory on-board, and external memory in addition to that available on-board the CPU, and also includes memory for data storage in addition to the control program. The sensor module 12 also has a power source 27, which may be a battery, a connection to an AC power outlet or a solar power transducer and storage circuit. The sensor module 12 also includes a small visual display 28 and an alarm 29 having an audible mode of operation and an inaudible, vibratory mode of operation.

Figure 3:
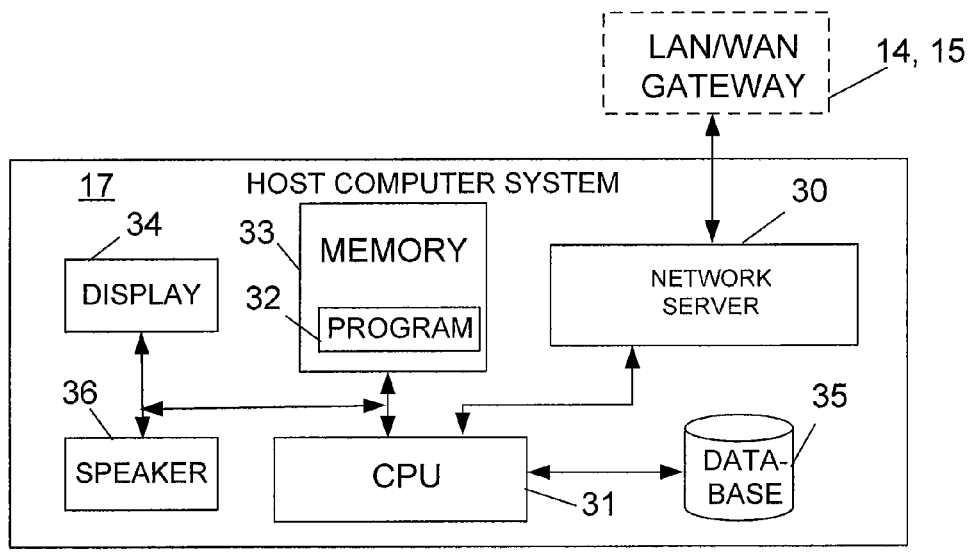
FIG. 3 is a block diagram of a central computer system for collecting data from the sensors through the network, and for providing a forewarning signal.

Referring to FIG. 3, the host computer system 17, which can be addressed at an Internet address, has a network server portion 30 for transmitting and receiving data on the Internet. The host computer system also has a microelectronic central processing unit (CPU) 31, also referred to more generally and more commonly as "a processor." The CPU 31 is operated by executing instructions in a control program 32 stored in memory 33. The memory 32 is shown generally and may include both memory on-board, and external memory in addition to that available on the CPU 31, and also includes memory for data storage in addition to the control program. The host computer system 17 includes a visual display 34 and also has the ability to emit audible sounds through a built-in speaker 36. The host computer system 17 may also include a database 35, which can be stored in a computer memory or in an external bulk storage memory device of a type known in the art.

The methods disclosed herein can be used to continuously monitor civil structures or large manufacture items to detect impending failures, thereby detecting problems before they occur and thus allowing condition-based maintenance. The method is based on a premise that hysteresis strain energy (HSE) per unit time is the same as mechanical power invested in crack growth per unit time. Mechanical power can be computed from the force (a vector quantity), F, as mass times acceleration (a vector quantity), A, or F=mA. Also, velocity, V, (a vector quantity) is the time integral of acceleration, V=∫dt A. Mechanical power P (a scalar quantity) is the result of computing a vector dot-product of force and velocity, P=F·V. Consequently, mechanical (vibration) power in a complex structure can be determined by analysis of the tri-axial acceleration. Namely, the power per unit mass is P/m=F·V/m, so mechanical power can be computed from acceleration data as $$P/m = A \cdot \int dt A \qquad (1)$$

U.S. Pat. No. 6,460,012, assigned to the assignee herein, discloses a method for analysis of a load, L(t), and deflection, δ(t) versus time, t. The deflection can be expressed in relation to strain energy, U, by integration over the $N^{th}$ load-unload cycle ($\int_C$) of the structure as follows:

$$\int_C L \, d\delta = dU/dN. \qquad (2)$$

The chain rule expansion of the right-hand side of Equation (2) in crack length, a, gives:

$$\int_C L \, d\delta = (dU/da) \times (da/dN). \qquad (3)$$

The Griffith-energy criterion states that a crack cannot grow unless the strain energy per unit of crack length, dU/da, equals (or exceeds) the Griffith energy:

$$dU/da \leq G_{1C}. \qquad (4)$$

$G_{1C}$ is a material property, and the subscript, 1, is for mode-one failure (under tension). Substitution of Equation (4) for the case of equality into Equation (3) yields:

$$\int_C L \, d\delta = G_{1C}(da/dN). \qquad (5)$$

Consequently, the acquisition of load and deflection to obtain hysteresis strain energy, $\int_C L \, d\delta$, allows inference of the crack growth rate by re-arranging Equation (5):

$$da/dN = \int_C L \, d\delta / G_{1C}. \qquad (6)$$

Each load-unload cycle spans a cycle time, Δt, and corresponds to multiplication of the left-hand side of Eq. (5) by dN/dt, while the right-hand side is divided by Δt. The resultant form is then:

$$(da/dN)(dN/dt) = (1/\Delta t) \int_C L \, d\delta / G_{1C}. \qquad (7)$$

The form, (da/dN)(dN/dt), is simply the crack growth rate, da/dt, from the chain rule. The HSE over the cycle time, $(1/\Delta t)\int_C L \, d\delta$, is the hysteresis power that goes into growing the crack at this rate, da/dt. Consequently, Eq. (7) can be rewritten as:

$$da/dt = P/G_{1C}. \qquad (8)$$

The mechanical vibration power from Eq. (1) can then be substituted in Eq. (8) to yield:

$$da/dt = A \cdot \int dt A. \qquad (9)$$

Note that the mass (m) and Griffith energy ($G_{1C}$) have been dropped from Eq. (8), because they simply scale the equation by constant factor (m/$G_{1C}$). Eq. (9) means that the conversion of tri-axial acceleration (vector) to mechanical power (a scalar quantity) allows direct monitoring of the crack growth rate, as (for example) illustrated in FIG. 5. Because mechanical power (P) is a scalar quantity, this result is independent of the orientation of any tri-axial accelerometer in the case where acceleration is sensed along three axes which are orthogonal to each other.

Figure 5:
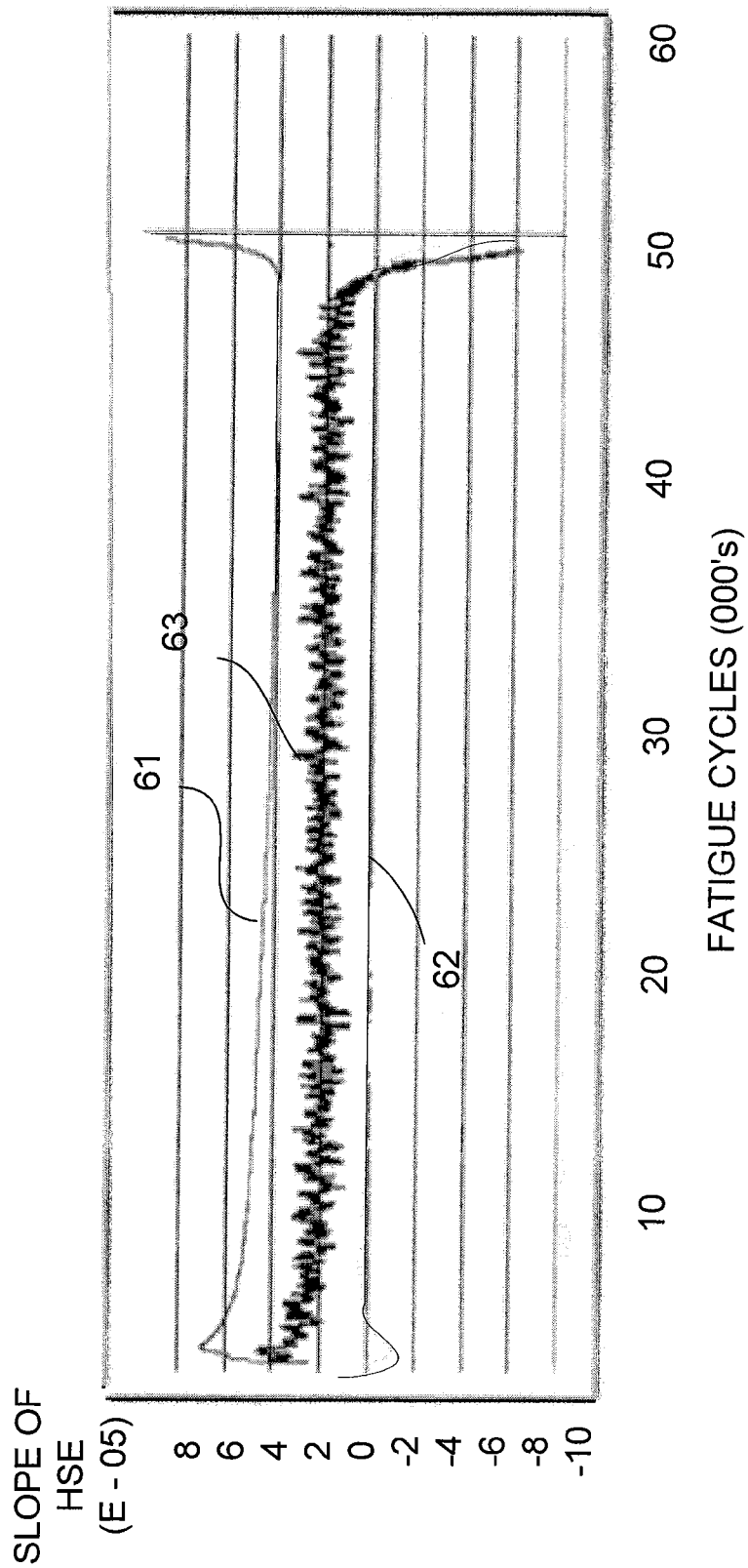
FIG. 5 is a graph of hysteresis strain energy as a function of fatigue cycles.

FIG. 5 shows that structural failure is indicated by a statistically significant change in the hysteresis strain energy (HSE), as an outlier in HSE slope beyond four standard deviations (4σ). FIG. 5 shows the slope of HSE versus number of fatigue cycles for corroded (10% thickness reduction), un-notched aluminum sample with typical failure forewarning in the last 1-5% of life. More specifically, the top curve 61 in FIG. 5 is +4σ above the running value of the slope of HSE. The bottom curve 62 in FIG. 5 is −4σ below the running value of the slope of HSE. The middle curve 63 is the HSE slope, which falls abruptly below the −4σ level at 49 000 cycles, as an indicator of structural failure.

This approach is also valid for mode-two (in-plane shear, or flexure) and mode-three (out-of-plane shear) failures. The method predicts failure within the last 1-20% of the total life cycles for a variety of materials (aluminum, steel, and glass-fiber/polymer matrix composite) across all three failure modes under a wide range of failure conditions: low-temperature creep crack growth; stress corrosion cracking; fatigue cracking; (un)corroded states; single- and multiple-site or widespread fatigue damage; constant amplitude loading, and periodic overloads. Further details are provided in Welch et al. in U.S. Pat. No. 6,460,012, which is hereby incorporated by reference.

Figure 4:
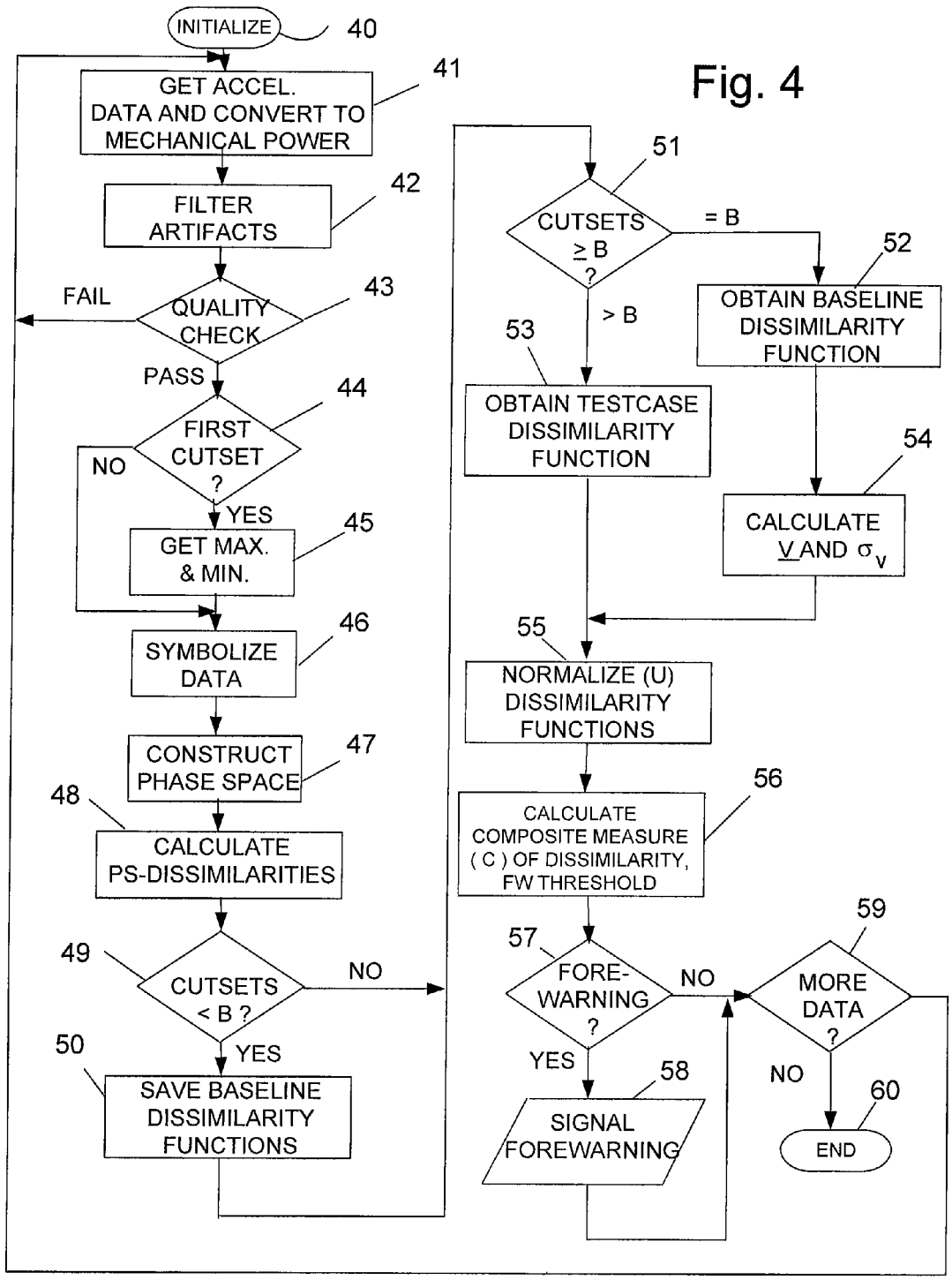
FIG. 4 is a flow chart of the processing of the sensor data at the central computer system to provide the forewarning signal.

FIG. 4 illustrates a method for providing forewarning of a critical event, such as a structural failure in a civil structure. This method is performed by one or more processors in executing instructions in one or more control programs, depending on the network configuration. In a first embodiment, the acceleration data is transmitted from the sensors 11 to the host computer system 17 which performs the operations diagrammed in FIG. 4. In a second embodiment, the operations are performed by each of the sensors 11 and a forewarning signal is signaled from the sensors 11 in the first instance, and may be relayed to the host computer.

This process of forewarning in other environments was disclosed in prior patents of one of the inventors herein, which are referred to in the Background of the Invention, including U.S. Pat. No. 7,209,861. In this application, the process shown in FIG. 4 is carried out in a computing apparatus in FIGS. 2 and 3, through execution of a program of computer instructions, represented by the blocks in FIG. 4 beginning with an initialization of parameters step represented by start block 40. Next, as represented by process block 41, acceleration data for multiple axes are acquired, either through a network or from memory, and are converted to a process-indicative scalar signal for mechanical power, P, according to Eq. (9) above. The mechanical power data, P, is sampled at equal time intervals, τ, starting at an initial time, $t_0$, yielding a sequence of N points, called a "cutset," $e_i = e(t_0 + i\tau)$. This is a subset of the dataset being analyzed.

Next, as represented by process block 42, artifacts are removed from the data with a zero-phase quadratic filter that performs better than conventional filters. This filter uses a moving window of 2w+1 points of data, with the same number of data points, w, on either side of a central point. A parabola is fitted in the least-squares sense to these data points, and the central point is selected to estimate the low-frequency artifact, $f_i$. The residual (artifact-filtered) signal, $g_i = e_i - f_i$, has essentially no low-frequency artifact activity. All subsequent analysis uses this artifact-filtered data, $g_i$. This is known in the art from U.S. Pat. No. 5,626,145.

Next, as represented by decision block 43, a quality check is made of the entire dataset as described in U.S. Pat. No. 5,815,412, col. 12, line 64 to col. 14, line 9. If poor data quality is detected the dataset is discarded, as represented by the "FAIL" result branch and the process returns to obtain a new set of data at process block 41. If the quality is suitable as represented by the "PASS" result branch, the routine proceeds to the next decision block 44.

A test is then made for whether this is the first cutset of data as represented by decision block 44. If so, as represented by the "YES" result, the minimum, and maximum, $g_{max}$, in the data are calculated of the first baseline cutset as represented by process block and 45 in FIG. 4. Each artifact-filtered point is converted into a discrete symbol, $s_i$, as one of S different integers in the range, $0 \leq s_i \leq S-1$. Contiguous, non-overlapping partitions are selected to obtain uniform symbols: $s_i = \text{INT}[S(g_i - g_{min})/(g_{max} - g_{min})]$ for $g_i < g_{max}$, and $s_i = S-1$ for $g_i = g_{max}$ to maintain exactly S discrete symbols as represented by process block 46 in FIG. 4. The function, INT, converts a decimal number to the next lowest integer [e.g., INT (3.14)=3].

Alternatively, equiprobable symbols are formed by ordering all N of the base case artifact-filtered, time-serial data points from the smallest to largest value. The first N/S of these ordered values correspond to the first symbol, 0. Ordered data values (N/S)+1 through 2N/S correspond to the second symbol, 1, and so on. Equiprobable symbols have non-uniform partitions in the signal amplitude with the same occurrence frequency of $g_i$ values by construction, and thus have no information about the dynamical structure. In contrast, symbols with uniform partitions (uniform symbols), $s_i = S(g_i - g_{min})/(g_{max} - g_{min})$, have inherent dynamical structure before beginning the (PS) reconstruction, where $g_{max}$ and $g_{min}$ are the maximum and minimum values of the $g_i$-data, respectively. Thus, one advantage of equiprobable symbols is that dynamical structure arises only from the PS reconstruction, as described below. Moreover, large negative and large positive values of $g_i$ have little effect on equiprobable symbolization, but dramatically change the partitions for uniform symbols.

Next, as represented by process block 47, the time-serial $s_i$-data are converted into a geometric object via phase-space (PS) reconstruction that uses time-delay vectors with the form, $$y(i) = [s_i, s_{i+\lambda}, \ldots, s_{i+(d-1)\lambda}], \tag{10}$$

which partitions the PS into $S^d$ hypercubes or bins. Each bin (or state) can be identified by a unique integer, J, via base-S arithmetic, namely, $J = \Sigma_m s_{i+\lambda} S^m$, where the summation, $\Sigma_m$, is over the range $0 \leq m \leq d-1$. Additional data channels may add more information about the data, implying that a multi-channel PS-vector could contain more information than a single channel. The multi-channel PS vector takes the form:

$$y(i) = [s_i(1), s_{i+\lambda}(1), \ldots, s_{i+(d-1)\lambda}(1), \ldots, s_i(Ch.), s_{i+\lambda}(Ch.), \ldots, s_{i+(d-1)\lambda}(Ch.)] \tag{11}$$

Here, the symbol, s(k) denotes values from the k-th channel, i.e., $1 \leq k \leq Ch.$, where Ch. is the total number of data channels. Now, the symbolization divides the multi-channel PS in $S^{dCh.}$ bins, where the bin identifier is $J = \Sigma_k \Sigma_m s_{i+m\lambda}(k) S^{m+d(k-1)}$. The choice of lag, λ, and embedding dimension, d, determines how well the PS reconstruction unfolds the dynamics. An excessively large embedding dimension could result in over-fitting of real data with finite length and noise.

Conversion of the time-serial data into discrete PS states allows the construction of a statistical distribution function (DF), as represented by process block 48, by counting the number of PS points that occur in each bin. The population of the ith bin of the DF, is denoted as $Q_i$, for the base case, and $R_i$ for a test case, respectively. An (un)changing DF indicates (un)altered dynamics. Next, a check is made to determine if the baseline number "B" of cutsets have been processed, as represented by decision block 49. The dissimilarity functions, DFs, from first B cutsets are saved as represented by blocks 50 in FIG. 1, to represent the nominal baseline dynamics. As represented by decision block 51, when the number of cutsets equals the statistical sample number, B, the baseline dissimilarity calculations are completed as represented by process block 52.

The baseline DFs correspond to the nominal-state dynamics. These B baseline DFs are exhaustively compared to one another in pair-wise fashion. This comparison is via the dissimilarity measures (DM) of Eqs. (12)-(15), as represented by block 54. V denotes the phase-space dissimilarity measures from the set, $V=\{L_N, L_C, \chi_N^2, \chi_C^2\}$. $\bar{V}$ is the mean value of the dissimilarity measure, which is computed by comparison among the B(B−1)/2 unique combinations of the B base case cutsets, along with a corresponding standard deviation, $\sigma_1$, for each DM from the set, V. The dissimilarity measures are computed as represented by block 53, between DFs for the baseline, $Q_i$, and test case, $R_i$, respectively. One set of dissimilarity measures (DM) for the non-connected phase space is:

$$\chi_N^2 = \sum_J (Q_J - R_J)^2 / (Q_J + R_J), \quad (12)$$

$$L_N = \sum_J |Q_J - R_J|. \quad (13)$$

The summations in Eqs. (12)-(13) run over all of the populated PS bins. The $\chi^2$ statistic is one of the most powerful, robust, and widely used tests for dissimilarity between two distribution functions (DFs). In this work, $\chi^2$ is not an unbiased statistic for accepting or rejecting a null statistical hypothesis but rather is a relative measure of dissimilarity between the two distribution functions (DFs). The $L_1$ distance is the natural metric for the distribution functions (DFs) by its direct relation to the total invariant measure on the attractor. These measures account for changes in the geometry and visitation frequency of the attractor. Consistent calculation requires the same number of points in both the base and test case distribution functions (DFs), identically sampled; otherwise the distribution functions must be resealed.

The accuracy and sensitivity of the PS reconstruction can be enhanced by connecting successive PS points as prescribed by the underlying dynamics, $y(i) \rightarrow y(i+\mu)$, for $\mu \geq 1$. Thus, we obtain a discrete representation of the process flow $Y(i)=[y(i), y(i+\mu)]$ that is formed by adjoining two successive vectors from the d-dimensional reconstructed PS. Y(i) is a 2d-dimensional, connected-phase-space (CPS) vector. As before, Q and R denote the CPS DFs for the base case and test case, respectively. We then define the measures of dissimilarity between these two CPS DFs via the $L_1$-distance and $\chi^2$ statistic, as before:

$$\chi_C^2 = \sum_{JK} (Q_{JK} - R_{JK})^2 / (Q_{JK} + R_{JK}), \quad (14)$$

$$L_C = \sum_{JK} |Q_{JK} - R_{JK}|. \quad (15)$$

The subscript c denotes connected phase space measures in Eqs. (14)-(15), while the subscript, N, in Eqs. (12)-(13) denotes non-connected phase space measures. The subscripts, J and K, are identifiers for the two successive PS states, y(i) and y(i+μ), respectively. Connected phase space measures have higher discriminating power than their non-connected counterparts. The quantities in Eqs. (11)-(14) are referred to as phase space dissimilarity measures (PSDM). Their definitions allow PSDM to detect transitions between regular and chaotic regimes, as well as to discriminate between different chaotic regimes. While straightforward methods exist for discriminating between regular and chaotic motion, or for detecting the transition between these regimes, discriminating between close chaotic regimes via traditional nonlinear measures (e.g., Lyapunov exponents, Kolmogorov entropy, and correlation dimension) is almost impossible. The reason for the superior performance of PSDM is rather simple: traditional nonlinear measures use a difference of averages, while PSDM use sums of the absolute value of differences.

Next, the dissimilarity measures are normalized by comparing each of the B baseline cutsets to each (ith) test case cutset, and then computing the corresponding average dissimilarity value, $V_i$, of the ith cutset as represented by process block 55. The normalized form is: $U(V)=|V_i-\bar{V}|/\sigma_1$, which is the number of standard deviations that the test case deviates from the baseline mean. Each contiguous, non-overlapping test case cutset is compared to each of the B base case cutsets, to obtain the corresponding average dissimilarity value, $V_i$, of the i-th analysis window for each dissimilarity measure. A statistically significant trend in the normalized dissimilarity measure indicates equipment degradation for failure forewarning.

Once the normalized measures for the test and base cases have been obtained, a forewarning status can be determined, as represented by process block 56, by computing a composite measure of dissimilarity ($C_i=L_N+L_C+\chi_N^2+\chi_C^2$) from the normalized measures of dissimilarity (U). A forewarning threshold is then developed by computing a cumulative sum of the composite measure of dissimilarity ($\Sigma_i C_i$) over a series of time frames. A straight-line fit is applied to the cumulative sum of composite measures ($\Sigma_i C_i$) using a least squares calculation. Then, a standard deviation ($\sigma_2$) is computed between the straight-line fit and the cumulative sum ($\Sigma_i C_i$). Event forewarning corresponds to the difference between the cumulative sum ($\Sigma_i C_i$) and the straight line fit exceeding a forewarning threshold by more than a selected number of standard deviations. In response to the composite measure ($C_i$) exceeding a forewarning threshold for a preselected number of occurrences, as represented by the "Yes" result from decision block 57, a forewarning signal of an impending critical event is provided to a human observer, as represented by I/O block 58, through one of or a combination of a visual signal, an audible signal or a tangible signal. An end-of-life failure forewarning threshold can also be determined and an end-of-life failure forewarning signal issued based on a number of successive occurrences of $C_i$ above a failure threshold over a selected time period, with the failure threshold being computed as disclosed in U.S. Pat. No. 7,209,861, col. 10, line 25 to col. 11, line 26. In an extension of this method disclosed in copending U.S. patent application Ser. No. 12/872,471, which is assigned to the assignee herein, a failure forewarning threshold for detecting failure forewarnings corresponds to a minimum in said standard deviation ($\sigma_2$) in relation to said straight-line fit of $\Sigma_i C_i$, which is the cumulative sum of the composite measure of dissimilarity over a sampling period. A failure value threshold is determined based on a number of failure forewarnings occurring after this minimum in the standard deviation is detected. In this case a forewarning of the impending critical event is signaled to a human observer, as represented in block 58, after either one of 1) a selected number of occurrences of the composite measure of dissimilarity ($C_i$) above the forewarning threshold or 2) after a selected number of occurrences of the composite measure of dissimilarity ($C_i$) above the failure threshold.

As represented by decision block 59, if the result from executing decision block 57 is "No," a check is then made for more data, and if more data is available, the routine returns to block 41, to continue the analysis for the next dataset via the above algorithm, and then combine the results for all of the datasets. If no more data is available, the execution is ended as represented by block 60.

This method can be applied to any large physical structure (e.g., bridge, aging aircraft, cranes, spacecraft, buildings) to forewarn of an impending structural failure under arbitrary loading, thus reducing the cost of inspections and repairs and conserving critical infrastructure. The method to perform this analysis has been demonstrated on desktop computers. Modern hand-held devices (e.g., PalmPRE and iPhone) are capable (in terms of CPU speed, memory, and on-board data storage) of carrying out the method as well. Such hand-held devices have embedded GPS (to provide geo-location), wireless communication (to send the forewarning information), and a tri-axial accelerometer (to acquire the acceleration data). Therefore, these devices could also be re-packaged and utilized as the sensors 11. And, a cellular network can be used in place of the Internet wide area network disclosed herein between the sensors 11 and a host computer in a cellular network.

After executing the program of instructions according to the methods described above, and as seen in FIGS. 2 and 3, the CPU 21 or the CPU 31 can transmit a signal through an output interface circuit of a type well known in the art to alarm devices 29 or 36, respectively, to emit an audible signal, or a tangible vibration signal, or to a screen display 28, 34 to provide visual signals or visual data. The output devices provide forewarnings prior to a critical event or prior to a failure event as described above.

This has been a description of examples of the invention. It will apparent to those of ordinary skill in the art that certain modifications might be made without departing from the scope of the invention, which is defined by the following claims.

We claim:

1. A method for processing data in a computing apparatus and signaling a forewarning of a failure of a physical structure, the method comprising:
    acquiring data for each one of a plurality of channels of axis data provided by at least one sensor that incorporates a multi-axis accelerometer that is mounted on the physical structure;
    computing process-indicative data, which is mechanical power data (P), from the multi-axial accelerometer data;
    acquiring a plurality of sets of the process-indicative data;
    computing a composite measure of dissimilarity ($C_i$) from normalized measures of dissimilarity (U) for distribution functions derived from a phase space for the plurality of sets of process-indicative data;
    determining a forewarning threshold based on the composite measure ($C_i$) exceeding a straight line fit by more than a preselected number of standard deviations; and
    in response to the composite measure ($C_1$) exceeding a forewarning threshold over a preselected number of occurrences, providing a forewarning signal to a human observer, through one or more of a visual signal, an audible signal and a tangible signal.

2. The method of claim 1, further comprising:
    computing a cumulative sum of the composite measure of dissimilarity ($\Sigma_i C_i$) over a series of time frames;
    applying a straight-line fit to the cumulative sum of composite measures ($\Sigma_i C_i$) using a least squares calculation;
    computing a standard deviation ($\sigma_2$) between the straight-line fit and the cumulative sum ($\Sigma_i C_i$); and
    determining a failure forewarning time threshold for detecting failure forewarnings, wherein said threshold corresponds to a time when there is a minimum in said standard deviation ($\sigma_2$).

3. The method of claim 1, further comprising:
    determining a time threshold for detecting failure forewarnings, wherein said time threshold corresponds to occurrence of a minimum in said standard deviation ($\sigma_2$) in relation to said straight-line fit;
    determining a failure value threshold corresponding to a value of the composite measure of dissimilarity ($C_i$) occurring after said time threshold; and
    providing a forewarning signal of an impending critical event to a human observer after either one of 1) a selected number of occurrences of the composite measure of dissimilarity ($C_i$) above the forewarning threshold or 2) after a selected number of occurrences of the composite measure of dissimilarity ($C_i$) above the failure value threshold.

4. The method of claim 1, wherein the forewarning signal is provided at a computer that receives accelerometer data from the sensor through a network, the computer responding to such accelerometer data to provide such a forewarning signal after at least one of 1) a selected number of occurrences of the composite measure of dissimilarity ($C_i$) above the forewarning threshold or 2) after a selected number of occurrences of the composite measure of dissimilarity ($C_i$) above the failure value threshold.

5. The method of claim 1, wherein the computation of a forewarning signal is performed at the sensor and a forewarning signal is transmitted via a network to a site where the forewarning signal causes the output the visual, audible or tangible signal to a human observer.

6. The method of claim 1, wherein mechanical power (P) is computed from accelerometer data as P=A·∫dt A.

7. The method of claim 6, wherein the computation of mechanical power is independent of an orientation of any accelerometer providing the accelerometer data.

8. The method of claim 1, wherein the physical structure is a civil structure including at least of a bridge, a dam, a building and a tunnel.

9. The method of claim 1, wherein the method is carried out in a sensor module mounted to the physical structure.

10. A sensor module for forewarning of a critical event in a larger-than-human-size physical structure, the sensor module comprising:
    means for mounting the sensor module on the physical structure,
    wherein the sensor module further comprises a multi-axis accelerometer producing accelerometer data for a plurality of axes of motion at a location on the physical structure;
    wherein the sensor module further comprises a processor that executes program instructions for computing mechanical power data (P) from the accelerometer data;
    wherein the processor computes a composite measure of dissimilarity ($C_i$) from normalized measures of dissimilarity for distribution functions derived from a phase space for a plurality of sets of mechanical power data;
    wherein the processor computes a forewarning of an impending critical event based on either one of a 1) a selected number of occurrences of the composite measure of dissimilarity ($C_i$) above the forewarning threshold or 2) after a selected number of occurrences of composite measure of dissimilarity ($C_i$) above a failure value threshold; and wherein the processor causes transmission of a forewarning signal of the impending critical event to a human observer, through one or more of a visual signal, an audible signal or a tangible signal.

11. The sensor module of claim 10, wherein mechanical power (P) is computed from accelerometer data as P=A·∫dt A.

12. The sensor module of claim 11, wherein the computation of mechanical power is independent of an orientation of any accelerometer providing the accelerometer data.

13. The sensor module of claim 10, wherein the larger-than-human-size physical structure is a civil structure including at least of a bridge, a dam, a building and a tunnel.

14. A method for monitoring structural integrity of a physical structure, the method comprising:
sensing mechanical vibrations at a plurality of locations in the structure with a respective plurality of sensors each including a tri-axial accelerometer mounted on the structure for providing data;
converting tri-axial acceleration data into mechanical power (P) data representative of hysteresis strain energy at the plurality of locations on the structure;
collecting the mechanical power (P) data at a single processing device;
processing the mechanical power (P) data within the single processing device to provide a failure forewarning threshold of an impending failure of the structure based on a number of occurrences of the mechanical power data exceeding the failure forewarning threshold over a predetermined sampling time; and
wherein the forewarning signal is provided to a human observer through a visual, audible or tangible signal.

15. The method of claim 14, wherein the mechanical power data is collected at a single processing device within a range of the physical structure determined by a range of a wireless local area network.

16. The method of claim 14, wherein the mechanical power data is collected through a wide area network at a single processing device that is remote from the physical structure.

17. The method of claim 14, wherein mechanical power (P) is computed from accelerometer data as P=A·∫dt A.

18. The method of claim 17, wherein the computation of mechanical power is independent of an orientation of any accelerometer providing the accelerometer data.

19. The method of claim 14, wherein the physical structure is a civil structure including at least of a bridge, a dam, a building and a tunnel.

20. A computer system for forewarning of a critical event in a larger-than-human-size physical structure, the system comprising:
a plurality of sensor units mounted on the physical structure, each including a tri-axial accelerometer and each producing data for a plurality of respective locations on the physical structure;
wherein the sensor units each include a radio transmitter for periodically transmitting radio signals carrying the accelerometer data representative of mechanical vibrations from the respective locations; and
a network gateway receiver receiving the radio signals from the sensor units and converting the radio signals to data for transmission over a wide area network;
a host computer receiving the accelerometer data transmitted through the wide area network;
wherein the host computer executes program instructions for computing vibration mechanical power data from multiple axes of accelerometer data for each respective sensor; and
providing a forewarning signal of an impending critical event to a human observer, through a visual, audible or tangible signal.

21. The computer system of claim 20, wherein the host computer executes program instructions for:
computing a forewarning threshold for detecting failure forewarnings based on measures of dissimilarity computed for the tri-axial accelerometer data for each respective sensor;
determining a failure value threshold that signals an impending critical event based on exceeding the forewarning threshold a preselected number of occurrences; and
providing a visual or audible forewarning signal of the impending critical event to a human observer after either one of 1) a selected number of occurrences of $C_i$ above the forewarning threshold or 2) after a selected number of occurrences of $C_i$ above the failure value threshold.

22. The computer system of claim 20, wherein the wide area network is a wired or wireless Internet network.

23. The computer system of claim 20, wherein the larger-than-human-size physical structure is a civil structure including at least of a bridge, a dam, a building and a tunnel.

24. The computer system of claim 20, wherein mechanical power (P) is computed from accelerometer data as P=A·∫dt A.

25. The computer system of claim 24, wherein the computation of mechanical power is independent of an orientation of any accelerometer providing the accelerometer data.

* * * * *